(12) United States Patent
Chamaken Kamde et al.

(10) Patent No.: US 12,196,309 B2
(45) Date of Patent: Jan. 14, 2025

(54) METHOD AND CONTROL UNIT FOR RESOLVING A TOOTH-ON-TOOTH POSITION OF A POSITIVE-LOCKING SHIFTING ELEMENT OF AN AUTOMATED MANUAL TRANSMISSION

(71) Applicant: ZF Friedrichshafen AG, Friedrichshafen (DE)

(72) Inventors: Alain Tierry Chamaken Kamde, Friedrichshafen (DE); Wilhelm Moser, Oberteuringen (DE); Markus Eisele, Friedrichshafen (DE); Rupert Kramer, Friedrichshafen (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 230 days.

(21) Appl. No.: 17/785,704

(22) PCT Filed: Dec. 10, 2020

(86) PCT No.: PCT/EP2020/085425
§ 371 (c)(1),
(2) Date: Jun. 15, 2022

(87) PCT Pub. No.: WO2021/122266
PCT Pub. Date: Jun. 24, 2021

(65) Prior Publication Data
US 2023/0047435 A1   Feb. 16, 2023

(30) Foreign Application Priority Data

Dec. 18, 2019   (DE) ................. 10 2019 219 961.5

(51) Int. Cl.
*F16H 61/06*   (2006.01)
*F16H 61/30*   (2006.01)
(Continued)

(52) U.S. Cl.
CPC ........... *F16H 61/061* (2013.01); *F16H 61/30* (2013.01); *F16H 63/3023* (2013.01); *F16H 2061/047* (2013.01); *F16H 2061/2823* (2013.01)

(58) Field of Classification Search
CPC .. F16H 61/061; F16H 61/30; F16H 2061/047; F16H 2061/2823; F16H 63/3023; F16D 48/06; F16D 48/10
See application file for complete search history.

(56) References Cited

U.S. PATENT DOCUMENTS 8,483,918 B2   7/2013   Arnold et al.
9,038,493 B2   5/2015   Iwasaki et al.
(Continued)

FOREIGN PATENT DOCUMENTS

DE   10 2008 054 635 A1   6/2010
DE   10 2009 002 205 A1   10/2010
(Continued)

OTHER PUBLICATIONS

German Patent Office, German Office Action issued in German Patent application No. 10 2019 219 961.5 (Aug. 26, 2020).
(Continued)

*Primary Examiner* — Edwin A Young
(74) *Attorney, Agent, or Firm* — Finch & Maloney PLLC (57) ABSTRACT

The present invention relates to a method for resolving a tooth-on-tooth position of a positive-locking shifting element of an automated manual transmission, in which gear steps of the automated manual transmission are changed by means of a pressure-medium-actuated shift actuator. If, during a change of a gear step of the automated manual transmission, a tooth-on-tooth position occurs at the interlocking shifting element, then the control of the pressure-medium-actuated shift actuator is varied in such manner as
(Continued)

to resolve the tooth-on-tooth position. A control unit for carrying out the method is also disclosed.

14 Claims, 6 Drawing Sheets

(51) Int. Cl.
*F16H 63/30* (2006.01)
*F16H 61/04* (2006.01)
*F16H 61/28* (2006.01)

(56) References Cited

U.S. PATENT DOCUMENTS

| | | | |
|---|---|---|---|
| 9,039,569 B2 | 5/2015 | Steinborn et al. | |
| 9,103,439 B2 | 8/2015 | Schneider et al. | |
| 9,217,504 B2 | 12/2015 | Haug et al. | |
| 2014/0073474 A1* | 3/2014 | Maurer | F16H 3/66 475/279 |
| 2014/0283637 A1 | 9/2014 | Iwasaki et al. | |

FOREIGN PATENT DOCUMENTS

| | | |
|---|---|---|
| DE | 10 2011 007 105 A1 | 10/2012 |
| DE | 10 2011 088 832 A1 | 6/2013 |
| DE | 10 2013 218 426 A1 | 3/2015 |
| DE | 10 2013 224 853 A1 | 6/2015 |
| DE | 10 2014 014 262 A1 | 3/2016 |

OTHER PUBLICATIONS

European Patent Office, International Search Report issued in International application No. PCT/EP2020/085425 (Mar. 11, 2021).
European Patent Office, Written Opinion issued in International application No. PCT/EP2020/085425 (Mar. 11, 2021).
China National Intellectual Property Administration, Office Action issued in Chinese patent application No. 202080080236.4 (Mar. 12, 2024).

* cited by examiner

METHOD AND CONTROL UNIT FOR RESOLVING A TOOTH-ON-TOOTH POSITION OF A POSITIVE-LOCKING SHIFTING ELEMENT OF AN AUTOMATED MANUAL TRANSMISSION

RELATED APPLICATIONS

This application claims priority under 35 U.S.C. § 371 as a U.S. National Application of application no. PCT/EP2020/085425, filed on 10 Dec. 2020, which claims priority to German Patent Application no. 10 2019 219 961.5 filed 18 Dec. 2019, the contents of which are hereby incorporated herein by reference in their entireties.

FIELD OF THE DISCLOSURE

The invention relates to a method for resolving a tooth-on-tooth position of an interlocking shifting element of an automated manual transmission. In addition, the invention relates to a control unit designed to carry out the said method, and a corresponding computer program for implementing the method on the control unit.

BACKGROUND

When a gearshift involving an interlocking shifting element is carried out in an automated manual transmission, a so-termed tooth-on-tooth position can occur at the interlocking shifting element, which prevents the interlocking shifting element from closing. To carry out a gearshift, such tooth-on-tooth positions must be resolved.

A tooth-on-tooth position can, for example, be recognized when a shifting path of a shifting device for engaging a gear of the transmission cannot reach its end position, but rather, remains in an intermediate position, or when the gear to be engaged has not been engaged within a predetermined time interval.

A method for resolving a tooth-on-tooth position at, an interlocking shifting element of a transmission is known from DE 10 2013 218 426 A1.

SUMMARY

The purpose of the present invention is to provide a new type of method for resolving a tooth-on-tooth position that occurs at a shifting element of interlocking design. In addition, a control unit designed to carry out the said method and a computer program for implementing the method on the control unit are indicated.

From the process-technological standpoint this objective is achieved by virtue of the characteristics specified herein. Furthermore, a control unit and computer program designed to carry out the method according to the invention are disclosed.

Advantageous further developments will be apparent in light of the claims, the description that follows, and the drawings. In this case, features described in connection with the method are also valid in connection with the control unit according to the invention and the computer program according to the invention, and vice-versa, so that in relation to the disclosure of the individual aspects of the invention reciprocal reference can always be made.

According to the present invention, a method for resolving a tooth-on-tooth position of an interlocking shifting element of an automated manual transmission is provided. Gear steps of the automated manual transmission can be changed by means of a shift actuator that can be activated by a pressure medium. The method for resolving a tooth-on-tooth position provides that when a tooth-on-tooth position occurs at the shifting element of interlocking design during a change of a gear step of the automated manual transmission, the control of the pressure-medium-activated shift actuator is varied in such manner that a pressure force prevailing at the tooth-on-tooth position is reduced.

Since the pressure force at the tooth-on-tooth position is reduced by modifying the control of the pressure-medium-activated shift actuator, so too is the torque that can be transmitted by way of the tooth-on-tooth position, whereby the tooth-on-tooth position can be resolved more easily.

In this context, an automated manual transmission means, in particular, a multi-gear transmission in which a plurality of gear steps, i.e. fixed gear ratios between two shafts of the transmission, can be engaged in an automated manner by shifting elements. Such transmissions are used mainly in motor vehicles in order to adapt the rotation speed and torque delivery characteristics of the drive unit in a suitable manner to suit the driving resistance of the motor vehicle. For example, the automated manual transmission can be in the form of a group transmission of a vehicle designed as a utility vehicle. By appropriate control of the shifting elements, the transmission can be shifted to a neutral position in which the drive unit is separated from the drive output. The interlocking shifting element can for example be a claw-type shifting element. The interlocking or claw-type shifting element can be of synchronized or unsynchronized design. The interlocking shifting element can in particular be in the form of a shifting clutch.

The pressure-medium-activated shift actuator for adjusting the interlocking shifting element can be in the form of a pneumatically or hydraulically actuated pressure medium cylinder. By means of the shift actuator a shifting mechanism of the transmission for adjusting the interlocking shifting element during a gearshift process is activated.

The position of the shifting mechanism can be detected during a gearshift process by means of a sensor. The sensor can be in the form of a position sensor, which can be arranged on the shift actuator or on the shifting mechanism of the transmission, for example on a shifting rail or a shifting fork.

To reduce the pressure force prevailing at the tooth-on-tooth position, in a preferred embodiment of the invention it is provided that a pressure in a pressure chamber of the shift actuator that is acted upon by pressure medium in order to change the gear step, is reduced. The pressure in the chamber of the shift actuator acted upon by pressure medium can for example be reduced to an ambient pressure. Ambient pressure is understood to mean the atmospheric air pressure. When the pressure in the pressure chamber of the shift actuator reaches the ambient pressure, then the shift actuator no longer exerts any force on the interlocking shifting element. Thereby, the torque that can be transmitted via the tooth-on-tooth position becomes zero and the frictional connection at the tooth-on-tooth position is released. Shifting claws of the interlocking shifting element can then rotate relative to one another. Thereafter, the pressure in the pressure chamber of the shift actuator is increased again in order to engage the gear of the automated manual transmission. If a further tooth-on-tooth position occurs when the gear is engaged, the reduction of the pressure in the pressure chamber of the shift actuator can be repeated.

The resolution of the tooth-on-tooth position can be assisted by applying an external torque to the interlocking shifting element. An external torque is understood to mean a torque that acts upon the interlocking shifting element independently of the activation of the shift actuator. For this purpose, both actuators functionally connected to half of the shifting element on the drive input side, and actuators functionally connected to half of the shifting element on the drive output side can be taken into account. As an actuator for resolving a tooth-on-tooth position, for example, an internal combustion engine that can be connected by a separator clutch to a transmission input shaft, an electric machine, a service brake of the motor vehicle, a transmission brake, for example arranged on a countershaft of the automated manual transmission, or a retarder acting on a transmission shaft, which can be in the form of a primary or a secondary retarder, can be chosen and controlled.

In a further embodiment of the invention it can be provided that to reduce the pressure force acting at the tooth-on-tooth position, a pressure in a counter-pressure chamber of the shift actuator is increased. In this case too, resolution of the tooth-on-tooth position can be assisted by applying an external torque to the interlocking shifting element. If the tooth-on-tooth position has been resolved by reducing the pressure force, then the pressure in the counter-pressure chamber of the shift actuator is reduced again. If the tooth-on-tooth position could not be resolved at the first attempt, a further attempt to resolve the tooth-on-tooth position can be carried out, during which the level of the pressure with which the counter-pressure chamber of the shift actuator is pressurized, is varied.

If a pressure chamber of the pressure-medium-activated shift actuator is acted upon by pressure in order to change a gear, then the shift actuator is actuated in a desired actuation direction. The counter-pressure chamber of the shift actuator should be understood to mean a pressure chamber of the shift actuator which, when acted upon by a pressure, produces a force on the shift actuator that acts in opposition to the desired actuation direction.

In this case, the level of the pressure is determined such that shifting in the shifting direction opposite to the desired shifting direction is avoided. The level of the pressure can be determined on the basis of a model, for example, by a linear condition observer. By determining the pressure level with which the counter-pressure chamber is acted upon, the switching valve can be controlled selectively in order to adjust the pressure, whereby the action of a counter-force acting upon the interlocking shifting element can be avoided. For the control of the switching valve, a so-termed dead time of the switching valve can also be taken into account.

To reduce the pressure force prevailing at the tooth-on-tooth position, in a preferred embodiment of the invention it can be provided that both the pressure in a pressure chamber of the shift actuator acted upon by pressure medium in order to change the gear step, and also the pressure in a corresponding counter-pressure chamber of the shift actuator, are increased. The pressurizing of the pressure chamber and the counter-pressure chamber can take place simultaneously.

In this case the counter-pressure chamber can be acted upon with a higher pressure, which results in a reduction of the pressure force prevailing at the tooth-on-tooth position. When determining the pressure level with which the pressure chamber and the counter-pressure chamber are pressurized, the effective areas of the said chambers are also taken into account.

The invention also relates to a control unit designed to carry out the method according to the invention. The control unit contains means that serve to carry out the method according to the invention. These means include hardware means and software means. The hardware means of the control unit are data interfaces for the exchange of data with the assemblies involved in carrying out the method according to the invention. For that purpose, the control unit is also connected to the necessary sensors and, if required, also to other control units for receiving the decision-relevant data and for emitting control commands. The control unit can for example be in the form of a transmission control unit. The hardware means of the control unit also include a processor for data processing and, if appropriate, a memory for data storage. The software means consist of program modules for carrying out the method according to the invention.

A computer program according to the invention is designed to enable a control unit to carry out the method according to the invention or a preferred further development thereof, when the computer program is run on the control unit. In this connection, the object of the invention also includes a computer-readable medium on which the above-described computer program is stored and from which it can be called up.

Below, the invention is explained in greater detail with reference to figures from which further preferred embodiments and features of the invention emerge. The figures show:

BRIEF DESCRIPTION OF THE DRAWINGS

Figure 1:
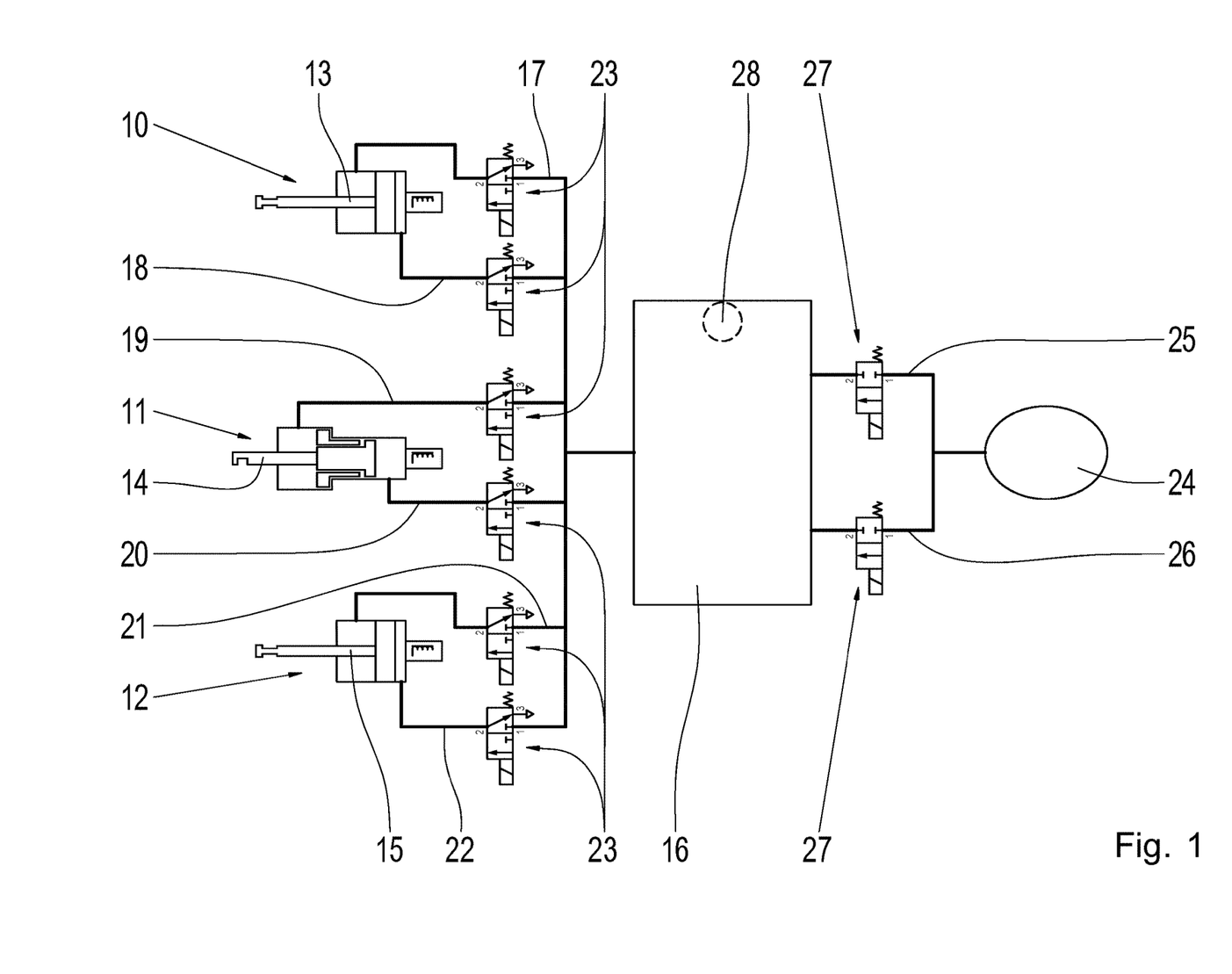
FIG. 1: A schematic representation of an automated group transmission.

FIG. 1 shows in a very schematic manner a block circuit diagram of a pneumatic shifting system of an automated manual transmission of a motor vehicle, the transmission being in the form of a group transmission.

DETAILED DESCRIPTION

FIG. 1 shows a number of pressure medium cylinders 10, 11, 12, namely a pressure medium cylinder 11 for a so-termed main group of the group transmission, a pressure cylinder 10 for a so-termed upstream group of the group transmission, and a pressure medium cylinder 12 for a so-termed downstream group of the group transmission. The upstream group is also known as the splitter and the downstream group is also known as the range group.

Each pressure medium cylinder 10, IL 12 has a respective piston 13, 14 or 15 arranged in a cylinder housing, which in the cylinder housing of the pressure medium cylinder concerned can be displaced longitudinally in order to carry out shifts in the respective group of the group transmission. Starting from a pressure adjustment space 16 of the transmission, the pressure medium cylinder 10, 11, 12 concerned can be supplied with compressed air, so for that purpose, from the said pressure adjustment space 16 compressed-air lines 17, 18 or 19, 20 or 21, 22, respectively, lead to the pressure medium cylinder 10, 11, 12 concerned. The pressure adjustment space 16 is also known as the transmission adjustment space.

In the example embodiment shown, in each case two compressed-air lines 17, 18 or 19, 20 or 21, 22 lead to each respective pressure medium cylinder 10, 11, 12 in order to supply pressure chambers of the respective pressure medium cylinder 10, 11, 12 with compressed air. In each of the compressed-air lines 17 to 22 there is arranged a respective valve 23.

The pressure adjustment space 16 can be supplied with compressed air from a reservoir container 24, also called an air pressure tank. From the storage reservoir 24 compressed-air lines 25, 26 lead toward the pressure adjustment space 16 in order to convey compressed air from the storage reservoir 24 to the pressure adjustment space, as a function of the position of valves 27 arranged in the said compressed-air lines 25, 26. The switching valves 27 connected between the storage reservoir 24 and the pressure adjustment space 16 are also called main switching valves.

A pressure sensor 28 is built into the pressure adjustment space 16, with the help of which the pressure in the pressure adjustment space 16 can be determined by measurement technology means. The pressure in the pressure adjustment space 16 is called the switching pressure. A pressure present in the air pressure tank 24 is referred to as the system pressure.

An actual switching pressure in the pressure adjustment space 16 determined by measurement technology with the help of the pressure sensor 28, can be compared with a desired target switching pressure in order, as a function of a deviation between the actual and the target switching pressures, to actuate the valve 27 so as to regulate the pressure in the pressure adjustment space 16. Besides the measurement-technological determination of the pressure in the pressure adjustment space 16, the switching pressure in the pressure adjustment space 16 can also be calculated during an on-going shifting process.

Figure 2:
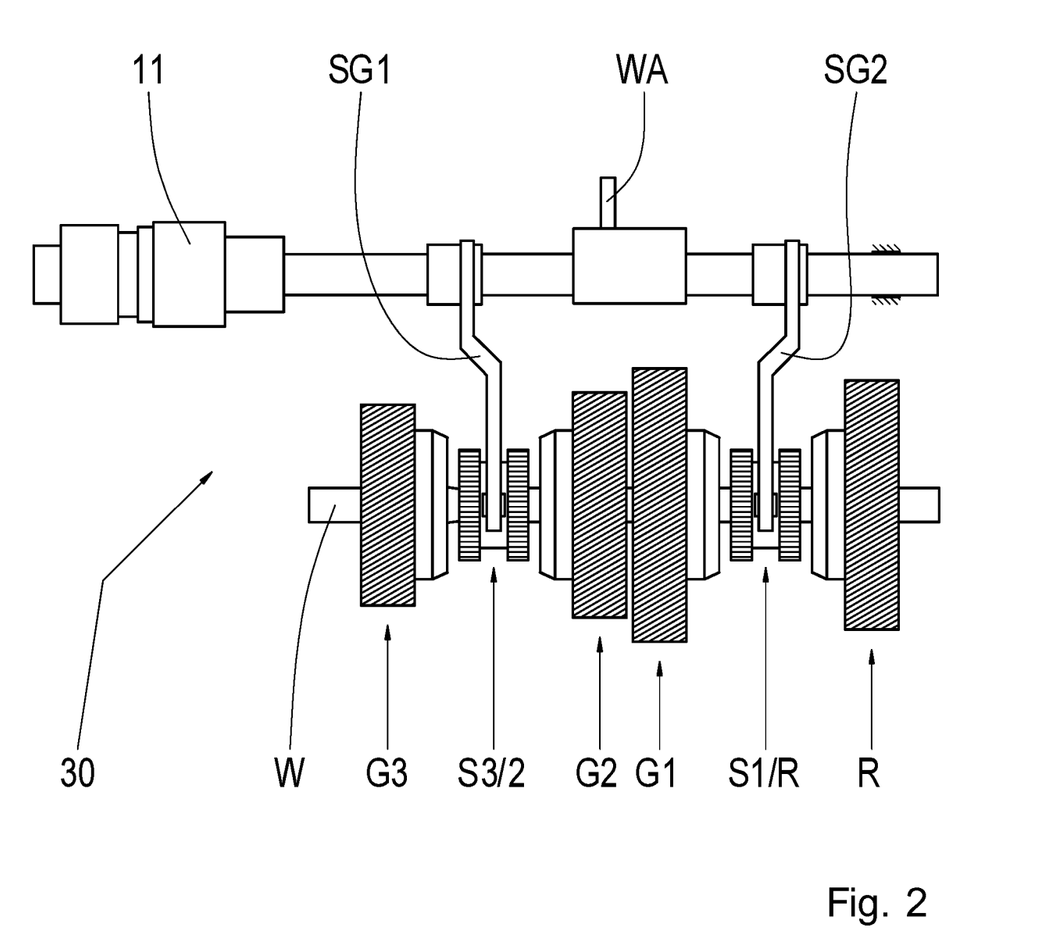
FIG. 2: A schematic representation of a shifting mechanism of the automated group transmission.

FIG. 2 shows part of a shifting mechanism 30 of the automated group transmission. The shifting mechanism 30 depicted serves to displace the shifting clutches of the main group of the group transmission. The main group is of three-stage design, with three gears G1, G2, G3 for forward driving and one gear R for reversing.

The main group of the group transmission is of countershaft design and comprises a main shaft W and two countershafts (not shown here), wherein one of the countershafts can be provided with a controllable transmission brake. Loose wheels of the gears G1, G2, G3 and R are in each case mounted to rotate on the main shaft W and can be shifted by means of associated shifting clutches. The associated fixed wheels are arranged rotationally fixed on the countershafts (not shown here).

The shifting clutches of the gears G3 and G2 and the shifting clutches of the gears G1 and R are, respectively in each case, combined in a common shifting packet S3/2 or S1/R. The main transmission is designed to be shifted without synchronization.

In this case the shifting clutches are actuated or controlled so as to engage a desired target gear G3, G2, G1, R by a control unit. The control unit can preferably be in the form of a transmission control unit. The shifting clutches can be actuated by means of the pressure medium cylinder 11. In the present case the pressure medium cylinder 11 is in the form of a pneumatic trailing cylinder. For this, the shifting mechanism 30 comprises at least two shifting forks SG1, SG2, which can be actuated by way of a shifting rail by actuating the pressure medium cylinder 11 in the axial direction in order to engage a target gear of the main group. In each case the shifting forks SG1, SG2 engage in a shifting sleeve of the shifting mechanism 30. The shifting sleeves are arranged to move axially on the main shaft W. In this case the shifting sleeves have outer teeth. When a gearshift process is carried out, the shifting sleeve concerned is brought into functional connection with a clutch body of a gearwheel or separated therefrom. The target gear can be selected by means of a selection actuator WA of the shifting mechanism. When a target gear is being engaged, a tooth-on-tooth position can occur, which prevents the engagement of the target gear. In a tooth-on-tooth position the shifting claws of the shifting sleeve and the shifting claws of the clutch body of the gearwheel are jammed against one another and rotate at the same rotation speed. Due to the jammed condition of the shifting claws of the interlocking shifting element it is then not possible to engage the target gear.

Figure 3:
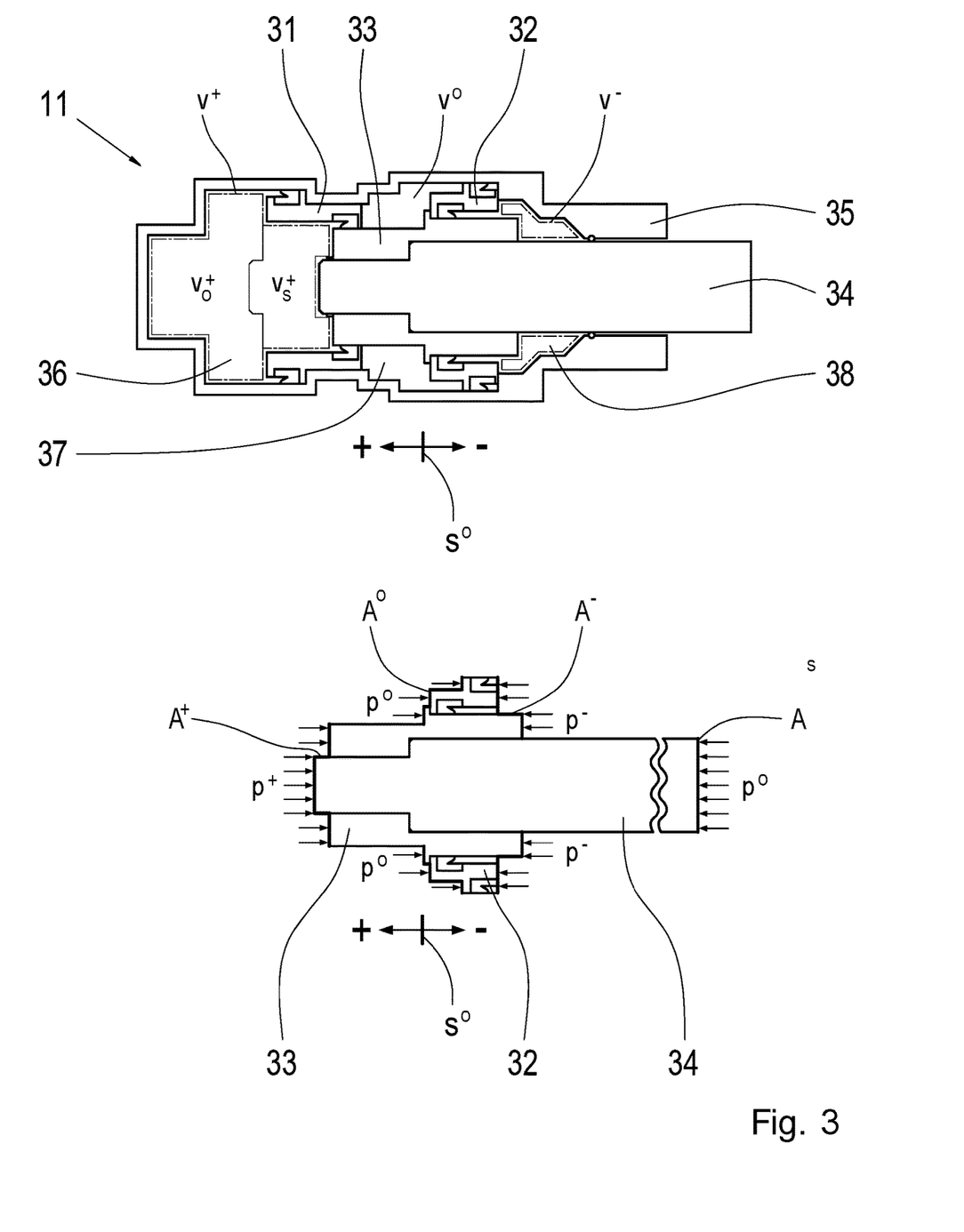
FIG. 3: A schematic representation of a pneumatic shifting cylinder.

A schematic representation of the pressure medium cylinder 11 in the form of a pneumatic trailing cylinder is shown in FIG. 3. The pressure medium cylinder 11 comprises a piston rod 34 by which the pressure medium cylinder 11 is connected to the shifting rail of the shifting mechanism 30. The piston rod 34 is guided to move axially in a cylinder housing 35. A trailing piston 33 is attached to the piston rod 34. Between the trailing piston 33 and the cylinder housing 35, drag rings 31, 32 are also arranged. The drag rings 31, 32 are fitted so as to slide on the trailing piston 33. Sealing elements are arranged both between the drag rings 31, 32 and the trailing piston 33 and also between the drag rings 31, 32 and the cylinder housing 35. Thanks to this arrangement the pneumatic pressure medium cylinder 11 has a plurality of pressure chambers 36, 37, 38.

Depending on the direction of movement (+/−), the following active volumes are formed in the individual pressure chambers 36, 37, 38 of the pressure medium cylinder 11:

$$V^{\pm} = V^{\pm}_0 + V^{\pm}_s, \quad (1)$$

$$V^{+}_s = (s_0 - s) * A^{+}, \quad (2)$$

$$V^{-}_s = (s_0 - s) * A^{-}, \quad (3)$$

in which $V^{\pm}$ is the active volume during a gearshift, $V^{\pm}_0$ is the active volume in a central position (neutral position) of the pressure medium cylinder, $V^{\pm}_s$ is the position-dependent active volume, $A^{\pm}$ is the effective piston area of the pressure chamber 36, 37, 38 concerned, s is the current shifting position and $s_0$ is the shifting position that corresponds to the neutral position. The piston areas $A^{\pm}$ and the volumes in the individual pressure chambers 36, 37, 38 are design parameters and are therefore known. The piston position s is measured by a path sensor during a gearshift operation and is therefore also known. The path sensor system can be in the form of a path sensor or a position sensor, which can be arranged on the shifting mechanism 30 of the group transmission or on the pressure medium cylinder 11.

From the pneumatic gas equation the pressure variation rates $\dot{p}$ in the individual pressure chambers 36, 37, 38 of the pressure medium cylinder 11, assuming a polytropic pressure build-up, are calculated as follows:

$$p^\pm * V^\pm = m^\pm * R * T, \quad (4)$$

$$\dot{p}^\pm = \frac{R.T.n}{V^\pm} * \dot{m}^\pm - \frac{\dot{V}^\pm}{V^\pm} * p^\pm, \quad (5)$$

$$\dot{m}^\pm = \frac{V^\pm}{R.T.n} * \dot{p}^\pm + \frac{\dot{V}^\pm}{R.T.n} * p^\pm, \quad (6)$$

in which $m^\pm$ is the mass of the air in the respective pressure chamber, R is the specific gas constant for air, T is the absolute temperature, n is the polytropic exponent, $\dot{p}$ is the pressure variation rate, $p^\pm$ is the pressure in the respective pressure chamber and $\dot{m}^\pm$ is the mass flow into the respective pressure chamber. The air mass flow $\dot{m}^\pm$ into the respective pressure chamber of the pressure medium cylinder 1I is controlled by the pneumatic valve 23. The valves 23 can for example be in the form of switching valves or proportional valves. In FIG. 3 the pressure medium cylinder 11 is in one of its end positions, i.e. in the automated manual transmission a gear is engaged. For this, the pressure chamber 36 is pressurized with a pressure medium and the piston rod 34 of the pressure medium cylinder 11 is pushed in the (−) movement direction. In the pressure chamber 36 there is then a position-dependent active volume $V^\pm_s$.

Figure 4:
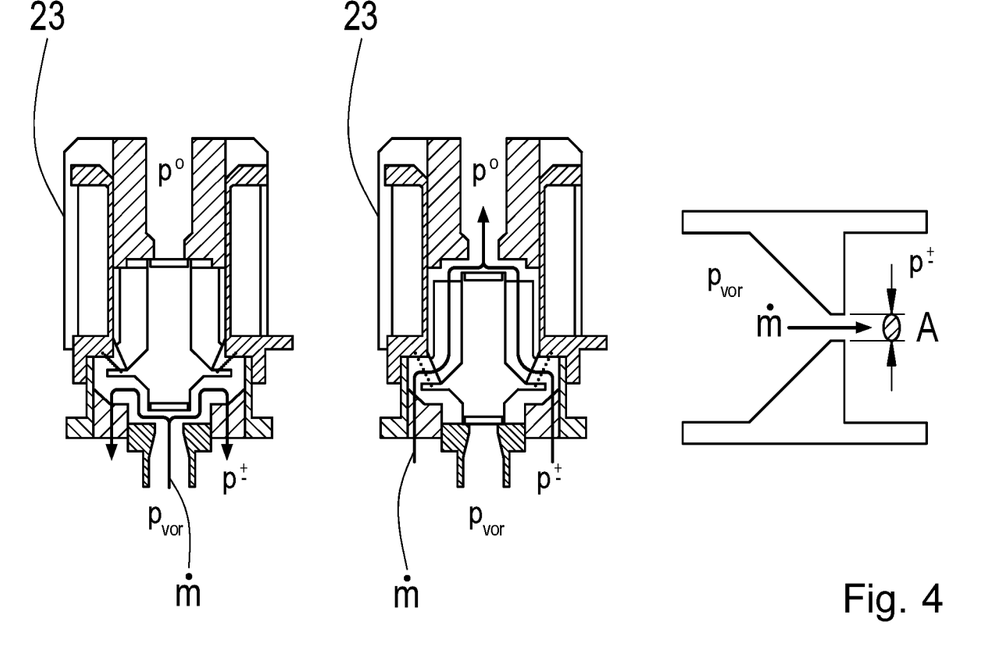
FIG. 4: A schematic representation of a pneumatic switching valve.

A schematic representation of a pneumatic switching valve 23 is shown in FIG. 4. The switching valve 23 is actuated electromagnetically. In the part of FIG. 4 on the left the switching valve 23 is actuated so as to fill the pressure chambers of the pressure medium cylinder 1I with pressure medium in order to shift the transmission. In this case, starting from the pressure adjustment space 16, in which there is a shifting pressure $p_{vor}$, an air mass flow $\dot{m}$ flows into the respective pressure chamber of the pressure medium cylinder 11, in which a corresponding pressure $p^\pm$ is produced. In the central part of FIG. 4 the switching valve 23 is actuated so as to vent the pressure chambers of the pressure medium cylinder 11. During this, starting from the pressure chamber of the pressure medium cylinder 11 an air mass flow $\dot{m}$ is discharged to the atmosphere. The part of FIG. 4 on the right shows a throttle function of the switching valve 23. The throttle is formed by a constriction of the flow cross-section and thus acts as a local flow resistance. Since the air mass flow $\dot{m}$ accumulates ahead of the cross-section restriction, a pressure difference $p_{vor}/p^\pm$ is produced.

The air mass flow m− through a switching valve can be modeled as follows:

$$\dot{m} = C * p_{vor} * \rho_0 * \sqrt{\frac{T_1}{T_0}} * \psi(p_{vor}, p^\pm) mit \psi(p_{vor}, p^\pm) \quad (7)$$

$$= \sqrt{\left(\frac{\frac{p^\pm}{p_{out}} - b}{1 - b}\right)^2}$$

in which C is the conductance of the valve, $\rho_0$ is the air density, $T_0$ is the absolute temperature of the air in the normal condition, $\psi(p_{vor}, p^\pm)$ is the outflow function, b is the critical pressure ratio of the valve, $p_{vor}$ is the air pressure ahead of the throttle and $p^\pm$ is the air pressure after the throttle.

With the help of equations (6) and (7) the valve parameters C and b can be determined. To determine the valve parameters the pressures $p^\pm$ and $p_1$ must be measurable. These valve parameters are necessary for the model-based detection and resolution of tooth-on-tooth positions. A movement of the piston of the pressure medium cylinder 11 can be modeled, preferably according to the following formulae:

$$m*\ddot{s}=(p^\pm-p_0)*A^- - (p_{vor}-p_0)*A^+ - F_{ext}, \quad (8)$$

$$m*\ddot{s}=F-F_{ext} \quad (9)$$

in which m is the mass of the piston, $\ddot{s}$ is the acceleration of the piston, $p_0$ is the atmospheric air pressure, $F_{ext}$ is the sum of all the external forces acting on the piston, such as friction forces, and F is the force applied by the piston.

Figure 5:
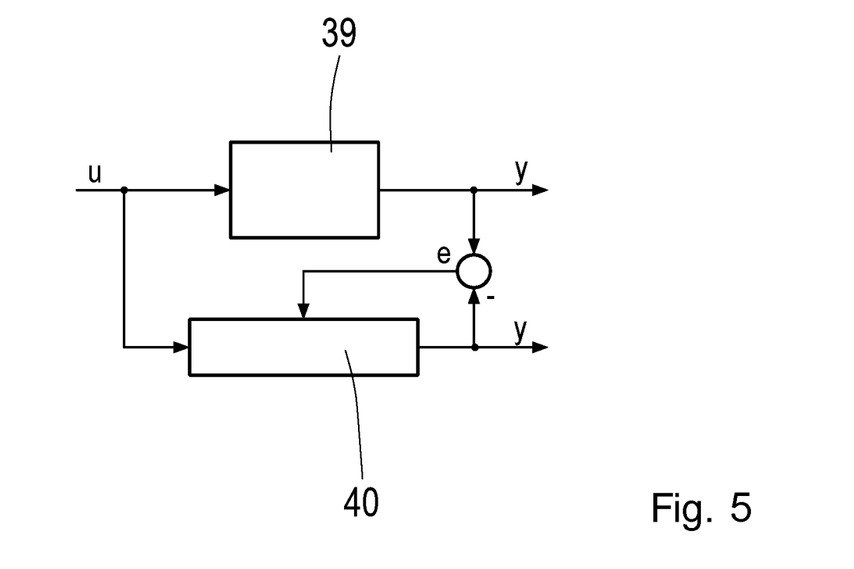
FIG. 5: A structure of a condition observer.

In model-based approaches to the recognition of tooth-on-tooth positions, information about the behavior of the model can be used to good advantage. In this, the movement of the piston of the pressure medium cylinder 11, described by the mathematical equations derived above, is simulated in real time. At the same time the simulated values are compared with the actually measured values. If there are deviations between the simulated values and the measured values, then the model behavior is corrected in such manner that the error converges. A simulation model corrected in real time with measured values is also called an observer. A general structure of such as observer is shown in FIG. 5, in which the observer is pictured as a linear condition observer. In this the transmission as a reference system is indexed 39, while the observer is indexed 40.

In the observer design a quality function can be minimized by virtue of an infinite time horizon, preferably in accordance with the following formula:

$$J(t)=\tfrac{1}{2}\int_{t=0}^{\infty}(x^T(t)*Q*x(t)+r*e^2(t)) \quad (10)$$

in which Q is a symmetrical, positive definite weighting matrix and r is a positive scalar magnitude.

The optimization problem formulated in equation (10) requires the solution of the following algebraic Riccati equation, from which the optimal observer reinforcement can be calculated:

$$P*A^T+A*P-P*c^T*r^{-1}*c*P+Q=0 \quad (11)$$

$$l=-r^{-1}*P*c^T \quad (12)$$

The advantage of a linear condition observer is in particular that in addition to the system outlet it can also estimate further condition magnitudes. Since in the present method for detecting a tooth-on-tooth position only the position of the piston of the pressure medium cylinder 11 is measured, other conditions such as the speed of the piston or the piston force can be estimated by the observer.

In a tooth-on-tooth position shifting claws of the shifting element of interlocking design are jammed against one another and are therefore frictionally connected with one another. The maximum torque that can be transmitted by the frictional connection can be determined approximately from the following equation:

$$M_{max}=F*\mu_R*\bar{r}$$

in which F is the pressure force, $\mu_R$ is the coefficient of friction, $\bar{r}$ is the mean friction radius and $M_{max}$ is the maximum torque that can be transmitted.

The tooth-on-tooth position can be resolved if the torque that can be transmitted falls below the maximum, when a static friction between the shifting claws of the interlocking shifting element is overcome. Thereby a relative rotation between the shifting claws of the interlocking shifting element allows the shifting claws to slip, which can ultimately result in meshing of the shifting claws.

Figure 6:
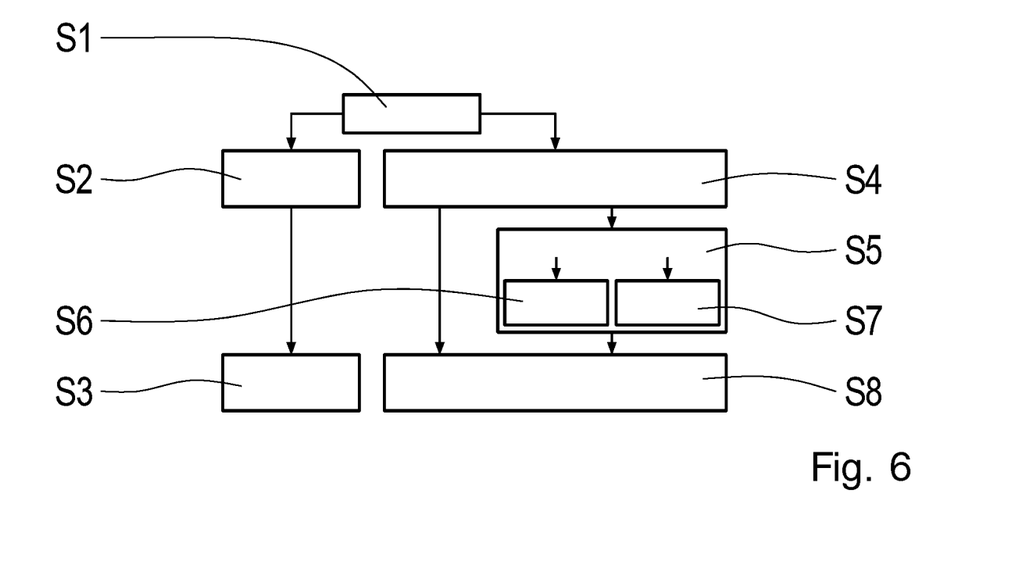
FIG. 6: A block diagram of a possible approach for resolving a tooth-on-tooth position.

FIG. 6 shows a block diagram with possible approaches for resolving a tooth-on-tooth position. If in a block S1 a tooth-on-tooth position is detected while changing a gear of the automated manual transmission, in a block S2 the shifting process can be re-initiated. For this a pressure in the pressurized pressure chamber 36 of the pressure medium cylinder 11 is reduced, whereby the torque that can be transmitted by the tooth-on-tooth position becomes zero and a static friction between the shifting claws of the interlocking shifting element can be overcome in a block S3. Thereafter, the pressure in the pressure chamber 36 of the pressure medium cylinder 11 is increased again in order to engage the gear of the automated manual transmission.

Starting from the block S1, to resolve the tooth-on-tooth position it can be provided in a block S4 that the maximum transmissible torque $M_{max}$ at the tooth-on-tooth position is overcome. For this, starting from the block S4 the system progresses to a block S8 in which an external torque is applied to the interlocking shifting element, by which the tooth-on-tooth position is resolved. Starting from the block S4, in a block S5 the tooth-on-tooth position can be resolved by reducing the pressure force existing at the tooth-on-tooth position. For this, in a block S6 a pressure in the pressurized pressure chamber 36 of the pressure medium cylinder 11 can be reduced or in a block S7 a pressure in a counter-pressure chamber 38 can be increased. In addition to the pressure adaptation in block S6 or block S7, the tooth-on-tooth position can be resolved by applying an external torque to the interlocking shifting element.

Figure 7:
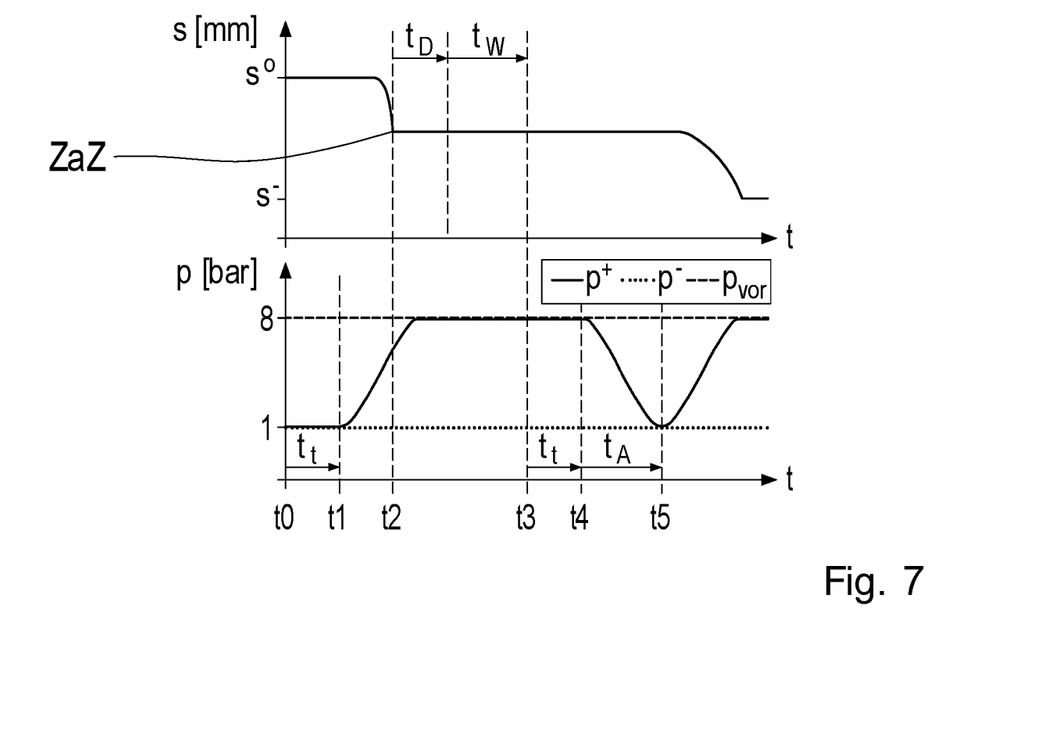
FIG. 7: A first characteristic curve shape for resolving a tooth-on-tooth position.

FIG. 7 shows a first characteristic curve shape for resolving a tooth-on-tooth position. At time t0 it is detected that a gear should be engaged in the automated manual transmission. For this a switching valve 23 is actuated in order to fill a pressure chamber 36 of the pressure medium cylinder 11 with compressed air so as to shift the transmission. Starting from a neutral position $s_0$ of the pressure medium cylinder 11, after the end of a dead time $t_t$ of the switching valve, at time t1 the pressure chamber 36 of the pressure medium cylinder 11 is pressurized with compressed air in order to engage a target gear. At time t2 a tooth-on-tooth position occurs at the interlocking shifting element. After the lapse of a detection time $t_D$, for example of 40 ms, the tooth-on-tooth position is recognized. After the lapse of an optional waiting time $t_W$ during which the system waits to see whether the tooth-on-tooth position resolves itself, at time t3 the switching valve 23 is deactivated, whereby after the lapse of a dead time $t_t$ the pressure chamber 36 of the pressure medium cylinder 11 is vented at time t4. The optional waiting time $t_W$ can for example be 50 ms. During a time period $t_A$ the pressure in the pressure chamber 36 is reduced in order to resolve the tooth-on-tooth position until at time t5 it has fallen to the level of the ambient pressure. After the tooth-on-tooth position has been resolved, the pressure chamber 36 of the pressure medium cylinder 11 is re-pressurized with compressed air in order to complete the shifting process. When the gear has been engaged, the pressure medium cylinder 11 is in its end position s⁻. The shifting pressure $p_{vor}$ in the pressure adjustment space 16 is constant during the shifting process, and in this case is around 8 bar.

Figure 8:
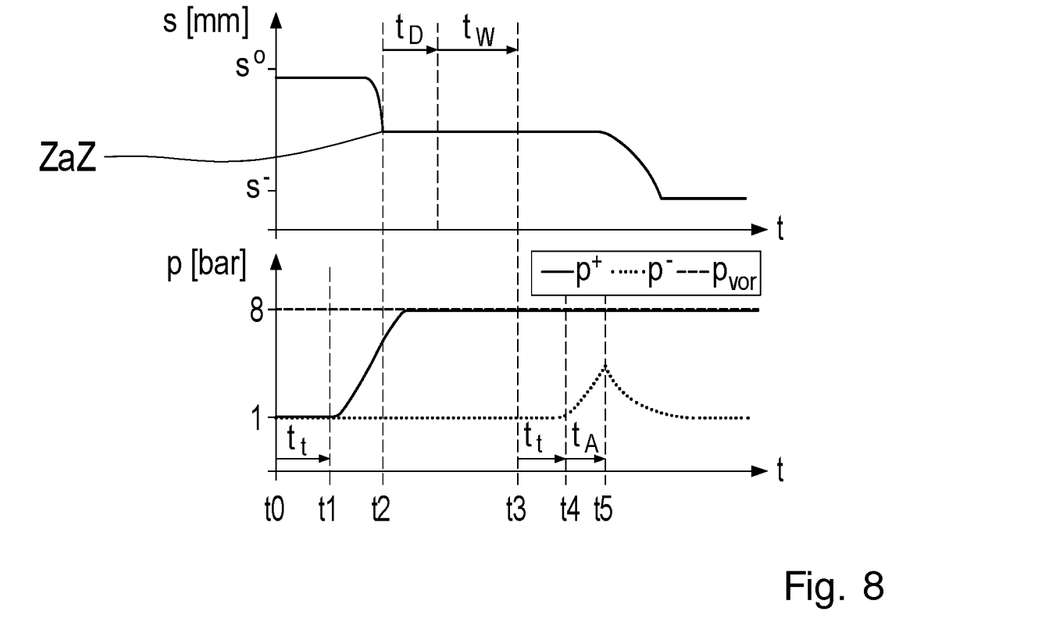
FIG. 8: A second characteristic curve shape for resolving a tooth-on-tooth position.

FIG. 8 shows a second characteristic curve shape for resolving a tooth-on-tooth position. At time t0 it is detected that a gear should be engaged in the automated manual transmission. For this a switching valve 23 is activated in order to fill a pressure chamber 36 of the pressure medium cylinder 11 with pressure medium so as to shift the transmission. Starting from a neutral position $s_0$ of the pressure medium cylinder 11, after a dead time $t_t$ of the switching valve 23, at time t1 the pressure chamber 36 of the pressure medium cylinder 11 is pressurized with compressed air in order to engage a target gear. At time t2 a tooth-on-tooth position occurs at the interlocking shifting element. The tooth-on-tooth position is recognized after the lapse of a detection time $t_D$ for example of 35 ms. After the lapse of an optional waiting time $t_W$ during which the system waits to see whether the tooth-on-tooth position resolves itself, at time t3 a switching valve 23 is activated, whereby after the lapse of a dead time $t_t$ the counter-pressure chamber 38 of the pressure medium cylinder 11 is filled with compressed air at time t4. The optional waiting time $t_W$ can for example be 50 ms. During a time period $t_A$ the pressure in the counter-pressure chamber 38 is increased to resolve the tooth-on-tooth position, whereby the pressure force at the tooth-on-tooth position decreases. At time t5 the tooth-on-tooth position at the interlocking shifting element is resolved and the pressure in the counter-pressure chamber 38 is reduced again. When the gear has been engaged the pressure medium cylinder 11 is at its end position s⁻. The shifting pressure $p_{vor}$ in the pressure adjustment space 16 is constant during the shifting process and is around 8 bar.

Figure 9:
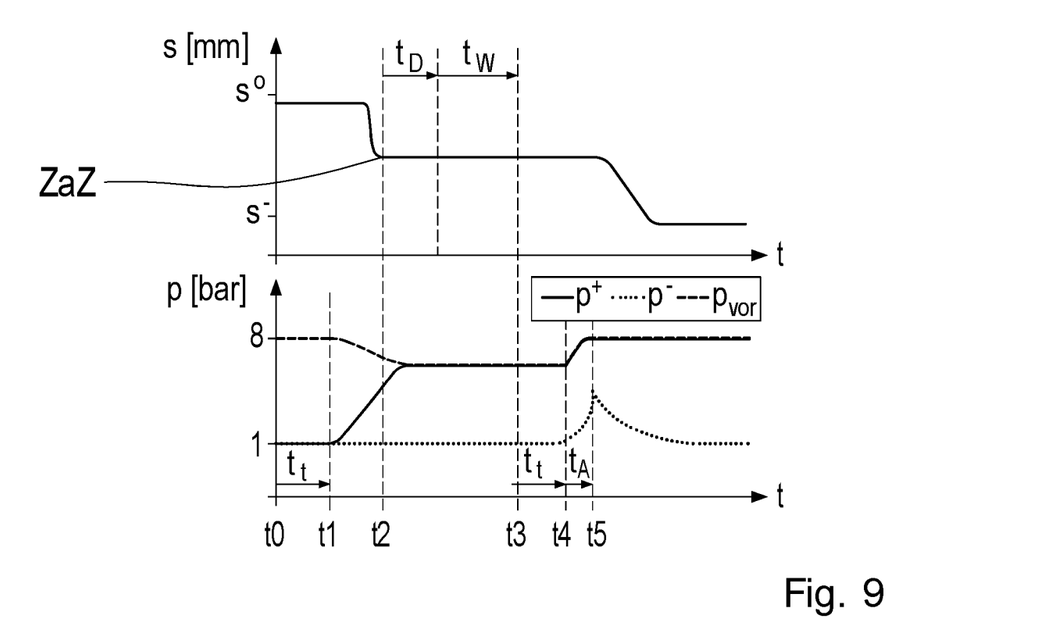
FIG. 9: A third characteristic curve shape for resolving a tooth-on-tooth position.

FIG. 9 shows a further characteristic curve shape for resolving a tooth-on-tooth position. This characteristic curve shape differs from the characteristic curve shapes shown in FIGS. 7 and 8, among other things in that the shifting pressure $p_{vor}$ in the pressure adjustment space 16 is not kept constant during the course of the gearshift. Rather, in this shifting sequence only the compressed air which is present in the pressure adjustment space 16 is available for engaging the new gear.

At time t0 it is detected that a gear should be engaged in the automated manual transmission. For this, a switching valve 23 is activated in order to fill a pressure chamber 36 of the pressure medium cylinder 11 with pressure medium so as to shift the transmission. Starting from a neutral position $s_0$ of the pressure medium cylinder 11, after a dead time $t_t$ of the switching valve, at time t1 the pressure chamber 36 of the pressure medium cylinder 11 is pressurized with compressed air in order to engage a target gear. Since in this case only the compressed air present in the pressure adjustment space 16 is available for engaging the new gear, the shifting pressure $p_{vor}$ in the pressure adjustment space 16 decreases, while the pressure chamber 36 of the pressure medium cylinder 11 is filled with compressed air. Then, the shifting pressure $p_{vor}$ in the pressure adjustment space 16 is, for example, at a pressure level of approximately 6 bar. At time t2, a tooth-on-tooth position occurs at the interlocking shifting element. After the lapse of a detection time $t_D$ for example of 35 ms, the tooth-on-tooth position is recognized. After the lapse of an optional waiting time $t_W$ to see whether the tooth-on-tooth position resolves itself, at time t3 a switching valve 23 is activated by which, after a dead time $t_t$, the counter-pressure chamber 38 of the pressure medium cylinder 11 is filled with compressed air. At time t3 a switching valve 27 is also activated to regulate the shifting pressure $p_{vor}$ in the pressure adjustment space 16. Then, compressed air flows from the pressure tank 24 into the pressure adjustment space 16 until the shifting pressure $p_{vor}$ in the pressure adjustment space 16 is restored to 8 bar again. If a tooth-on-tooth position is recognized, then during a time period $t_A$ for example of 20 ms both the pressure chamber 36 and the counter-pressure chamber 38 are filled with compressed air, in order to resolve the tooth-on-tooth position. Owing to the different active areas of the piston of the pressure medium cylinder, the resulting force of the piston and thus the pressure force on the tooth-on-tooth position decreases. At time t5 the tooth-on-tooth position at the interlocking shifting element is resolved and the pressure in the counter-pressure chamber 38 is reduced again. When the gear is engaged the pressure medium cylinder 11 is at its end position s⁻. The optional waiting time $t_W$ can for example be 50 ms.

The proposed methods for resolving tooth-on-tooth positions in an automated manual transmission are very effective and require both little memory space and little computation effort, since no complex characteristics are needed.

INDEXES

10 Pressure medium cylinder/Shift actuator
11 Pressure medium cylinder/Shift actuator
12 Pressure medium cylinder/Shift actuator
13 Piston
14 Piston
15 Piston
16 Pressure adjustment space
17 Pressure medium line
18 Pressure medium line
19 Pressure medium line
20 Pressure medium line
21 Pressure medium line
22 Pressure medium line
23 Valve
24 Storage container
25 Pressure medium line
26 Pressure medium line
27 Valve
28 Pressure sensor
30 Shifting mechanism
31 Drag ring
32 Drag ring
33 Trailing piston
34 Piston rod
35 Cylinder housing
36 Pressure chamber
37 Pressure chamber
38 Pressure chamber
39 Transmission as a reference system
40 Observer
SG1 First shifting fork
SG2 Second shifting fork
WA Selection actuator
G1 (First) gear step (HG)
G2 Second gear step (HG)
G3 Third gear step (HG)
R Reversing gear (HG)
S1/R Shifting packet (HG)
S3/2 Shifting packet (HG)
W Main shaft (HG)

The invention claimed is:

1. A method for resolving a tooth-on-tooth position of an interlocking shifting element of an automated manual transmission, the interlocking shifting element being actuatable by a pressure-medium-actuated shift actuator, the method comprising:
initiating changing a gear of the automated manual transmission by means of the shift actuator by adjusting a pressure in a pressure chamber of the shift actuator with a pressure medium to move a piston rod connected to the interlocking shifting element in a desired shifting direction;
detecting the tooth-on-tooth position at the interlocking shifting element during changing the gear; and
varying control of the shift actuator by adjusting the pressure in the pressure chamber of the shift actuator to move the piston rod in an opposite direction to reduce a pressure force acting on the tooth-on-tooth position.

2. The method according to claim 1, comprising after detection of the tooth-on-tooth position, waiting for lapse of a period of detection time before recognizing the tooth-on-tooth position, the tooth-on-tooth position being detected based on an axial position of the piston rod, and
upon recognition of the tooth-on-tooth position, actuating a valve to reduce the pressure in the pressure chamber of the shift actuator acted upon by the pressure medium to resolve the tooth-on-tooth position; and
after actuation of the valve to reduce the pressure in the pressure chamber.

3. The method according to claim 2, comprising detecting the tooth-on-tooth position when movement of the piston rod in the desired shifting directions stops, and
reducing the pressure in the pressure chamber to an ambient pressure after the piston rod has remained stationary over the period of detection time.

4. The method according to claim 1, comprising:
providing a counter-pressure chamber of the shift actuator which is located relative to the piston rod such that pressurization of the counter-pressure chamber moves the piston rod the opposite direction; and
increasing a pressure in the counter-pressure chamber.

5. The method according to claim 4, comprising:
determining, by a condition observer, the pressure in the counter-pressure chamber to avoid shifting in the opposite direction which is opposite to the desired shifting direction.

6. The method according to claim 1, comprising:
increasing the pressure in the pressure chamber of the shift actuator acted upon by the pressure medium in order to change the gear; and
upon detection of the tooth-on-tooth position, increasing a pressure in a counter-pressure chamber of the shift actuator to move the piston rod in the opposite direction.

7. The method according to claim 6, comprising determining, by a condition observer, the pressure in the counter-pressure chamber to avoid shifting in the opposite direction which is opposite to the desired shifting direction.

8. The method according to claim 1, wherein varying control of the shift actuator includes taking into account a dead time of shifting valves which are actuated to control the pressure in the pressure chamber of the shift actuator.

9. The method according to claim 1, comprising applying an external torque to the interlocking shifting element in addition to adjusting the pressure in the pressure chamber of the shift actuator to move the piston rod in an opposite direction to resolve the tooth-on-tooth position.

10. A control unit programmed to carry out the method according to claim 1.

11. The control unit of claim 10, comprising computer-executable code, that when executed by the control unit, carries out the method of claim 1.

12. An automated manual transmission comprising the control unit according to claim 10.

13. An automated manual transmission according to claim 12, wherein the automated manual transmission is in the form of a group transmission of a motor vehicle.

14. A motor vehicle comprising the automated manual transmission according to claim 13.

* * * * *